US010402883B2

United States Patent
Nguyen et al.

(10) Patent No.: US 10,402,883 B2
(45) Date of Patent: Sep. 3, 2019

(54) SYSTEM AND METHOD FOR COMMUNITY AIDED RESEARCH AND SHOPPING

(71) Applicant: PayPal, Inc., San Jose, CA (US)

(72) Inventors: Hill Trung Nguyen, San Jose, CA (US); Jean-David Ruvini, Los Gatos, CA (US); Badrul M. Sarwar, San Jose, CA (US); Neelakantan Sundaresan, Mountain View, CA (US)

(73) Assignee: PAYPAL, INC., San Jose, CA (US)

( * ) Notice: Subject to any disclaimer, the term of this patent is extended or adjusted under 35 U.S.C. 154(b) by 960 days.

(21) Appl. No.: 14/028,225

(22) Filed: Sep. 16, 2013

(65) Prior Publication Data

US 2014/0032368 A1  Jan. 30, 2014

Related U.S. Application Data

(63) Continuation of application No. 12/133,100, filed on Jun. 4, 2008, now Pat. No. 8,538,821.

(51) Int. Cl.
*G06Q 30/06* (2012.01)

(52) U.S. Cl.
CPC ..... *G06Q 30/0627* (2013.01); *G06Q 30/0601* (2013.01); *G06Q 30/0603* (2013.01); *G06Q 30/0623* (2013.01); *G06Q 30/0641* (2013.01)

(58) Field of Classification Search
CPC ........... G06Q 30/0601; G06Q 30/0623; G06Q 30/0641
USPC .................................... 705/26.1, 26.61, 27.1
See application file for complete search history.

(56) References Cited

U.S. PATENT DOCUMENTS

| 7,043,443 | B1 | 5/2006 | Firestone |
| 7,512,551 | B2 | 3/2009 | Postrel |
| 7,536,323 | B2 | 5/2009 | Hsieh |
| 8,538,821 | B2 | 9/2013 | Nguyen et al. |
| 2003/0028585 | A1 | 2/2003 | Yeager et al. |
| 2003/0177121 | A1 | 9/2003 | Moona et al. |
| 2003/0177202 | A1* | 9/2003 | Suda ................. G06F 17/30861 709/218 |

(Continued)

OTHER PUBLICATIONS

U.S. Appl. No. 12/398,950, filed Mar. 5, 2009, Method and Apparatus for Social Network Qualification Systems.

(Continued)

*Primary Examiner* — Florian M Zeender
*Assistant Examiner* — Christopher R Buchanan
(74) *Attorney, Agent, or Firm* — Maschoff Brennan

(57) ABSTRACT

A system and method for providing product research help to a consumer doing internet shopping. A consumer helper application for internet commerce has been designed to integrate the techniques that are currently used by many internet consumers into a single application program. For example, the consumer helper application allows a user to take notes, store web site links, store web site annotations, obtain collaborative input, and perform other tasks commonly used by web site consumers. The consumer helper application stores all of the information gathered in a single place. Information provided by other consumers may be shared using the consumer helper application. The consumer helper application will suggest specific items for a consumer to purchase based up on the information gathered by the consumer into the consumer helper application.

20 Claims, 11 Drawing Sheets

(56) References Cited

U.S. PATENT DOCUMENTS

| | | | |
|---|---|---|---|
| 2003/0227479 | A1 | 12/2003 | Mizrahi et al. |
| 2005/0216913 | A1* | 9/2005 | Gemmell .......... G06F 17/30997 718/100 |
| 2005/0234958 | A1* | 10/2005 | Sipusic ................. G06F 3/0485 |
| 2006/0026147 | A1 | 2/2006 | Cone et al. |
| 2007/0023515 | A1 | 2/2007 | Urken |
| 2008/0071829 | A1* | 3/2008 | Monsarrat .......... G06Q 30/0217 |
| 2008/0140506 | A1 | 6/2008 | Christianson et al. |
| 2008/0183753 | A1* | 7/2008 | Maes .................. G06F 21/6218 |
| 2008/0222295 | A1 | 9/2008 | Robinson et al. |
| 2008/0243586 | A1 | 10/2008 | Dohring et al. |
| 2008/0255978 | A1* | 10/2008 | Dias ...................... G06Q 40/00 705/35 |
| 2009/0089678 | A1 | 4/2009 | Sacco et al. |
| 2009/0171813 | A1 | 7/2009 | Byrne et al. |
| 2009/0210244 | A1* | 8/2009 | Koister .................. G06Q 30/02 705/319 |
| 2009/0299667 | A1* | 12/2009 | Branson .............. G06F 11/3604 702/81 |
| 2009/0307100 | A1 | 12/2009 | Nguyen et al. |
| 2009/0313088 | A1 | 12/2009 | Ali et al. |
| 2010/0042511 | A1 | 2/2010 | Sundaresan et al. |

OTHER PUBLICATIONS

U.S. Appl. No. 12/133,100 U.S. Pat. No. 8,538,821, filed Jun. 4, 2008, System and Method for Community Aided Research and Shopping.

"U.S. Appl. No. 12/133,100, Non Final Office Action dated Dec. 22, 2010", 7 pgs.

"U.S. Appl. No. 12/133,100, Final Office Action dated Jul. 26, 2011", 7 pgs.

"U.S. Appl. No. 12/133,100, Non Final Office Action dated Nov. 6, 2012", 7 pgs.

"U.S. Appl. No. 12/133,100, Notice of Allowance dated May 16, 2013", 9 pgs.

"U.S. Appl. No. 12/133,100, Response filed Mar. 7, 2013 to Non Final Office Action dated Nov. 6, 2012", 14 pgs.

"U.S. Appl. No. 12/133,100, Response filed Nov. 28, 2011 to Non-Final Office Action dated Aug. 28, 2011", 11 pgs.

"U.S. Appl. No. 12/133,100, Response filed Mar. 18, 2011 to Non Final Office Action dated Dec. 22, 2010", 9 pgs.

"U.S. Appl. No. 12/398,950, Response filed Feb. 27, 2012 to Non Final Office Action dated Nov. 25, 2011", 11 pgs.

"U.S. Appl. No. 12/398,950, Decision on Pre-Appeal Brief mailed Nov. 2, 2012", 2 pgs.

"U.S. Appl. No. 12/398,950, Final Office Action dated Jun. 15, 2012", 18 pgs.

"U.S. Appl. No. 12/398,950, Non Final Office Action dated Jun. 14, 2011", 8 pgs.

"U.S. Appl. No. 12/398,950, Non Final Office Action dated Nov. 25, 2011", 12 pgs.

"U.S. Appl. No. 12/398,950, Pre-Appeal Brief Request for Review filed Sep. 17, 2012", 5 pgs.

"U.S. Appl. No. 12/398,950, Response filed May 31, 2011 to Restriction Requirement dated Mar. 23, 2011", 6 pgs.

"U.S. Appl. No. 12/398,950, Response filed Sep. 14, 2011 to Non Final Office Action dated Jun. 14, 2011", 11 pgs.

"U.S. Appl. No. 12/398,950, Restriction Requirement dated Mar. 23, 2011", 6 pgs.

"U.S. Appl. No. 12/133,100, 312 Amendment filed Sep. 5, 2013", 7 pgs.

"U.S. Appl. No. 12/398,950, Appeal Brief filed Dec. 14, 2015", 32 pgs.

"U.S. Appl. No. 12/398,950, Decision on Pre-Appeal Brief Request mailed Jul. 31, 2014", 2 pgs.

"U.S. Appl. No. 12/398,950, Final Office Action dated May 14, 2015", 6 pgs.

"U.S. Appl. No. 12/398,950, Final Office Action dated May 27, 2014", 27 pgs.

"U.S. Appl. No. 12/398,950, Non Final Office Action dated Jul. 14, 2014", 26 pgs.

"U.S. Appl. No. 12/398,950, Non Final Office Action dated Sep. 27, 2013", 12 pgs.

"U.S. Appl. No. 12/398,950, Pre-Appeal Brief Request filed Jun. 28, 2014", 5 pgs.

"U.S. Appl. No. 12/398,950, Respnse filed Nov. 14, 2014 to Non Final Office Action dated Jul. 14, 2014", 15 pgs.

"U.S. Appl. No. 12/398,950; Response filed Jan. 27, 2014 to Non-Final Office Action dated Sep. 27, 2013", 12 pgs.

\* cited by examiner

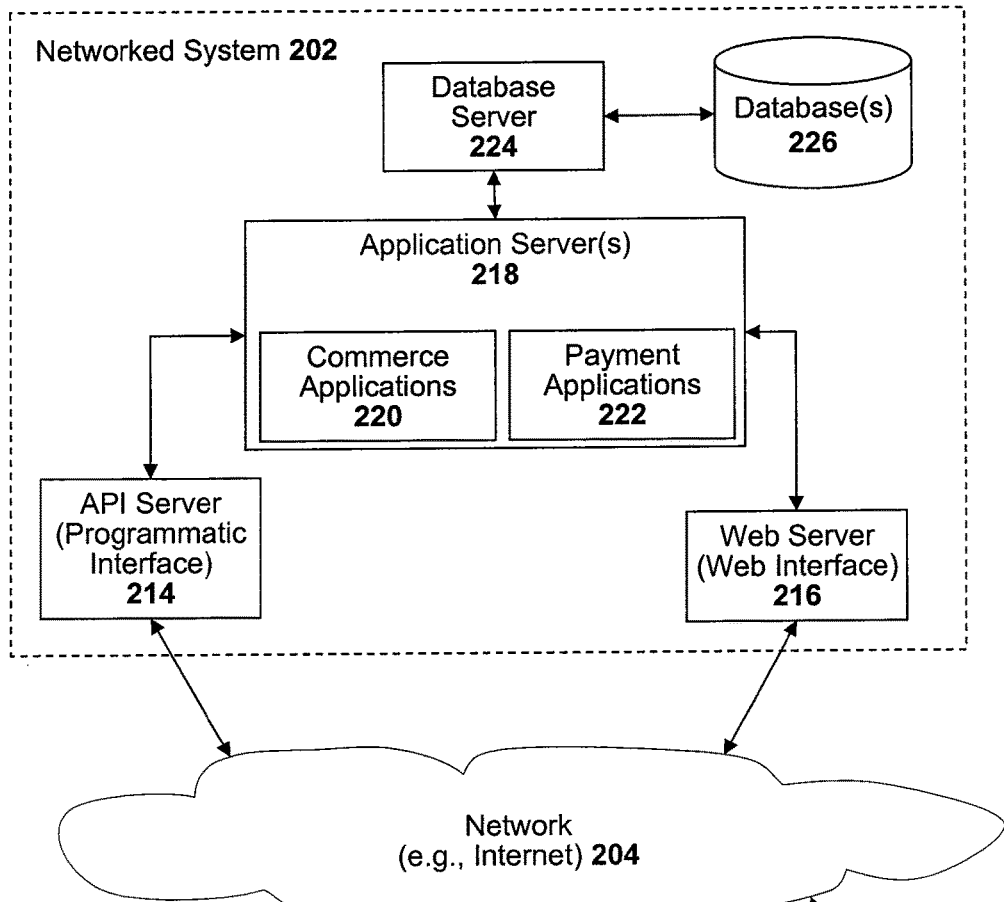
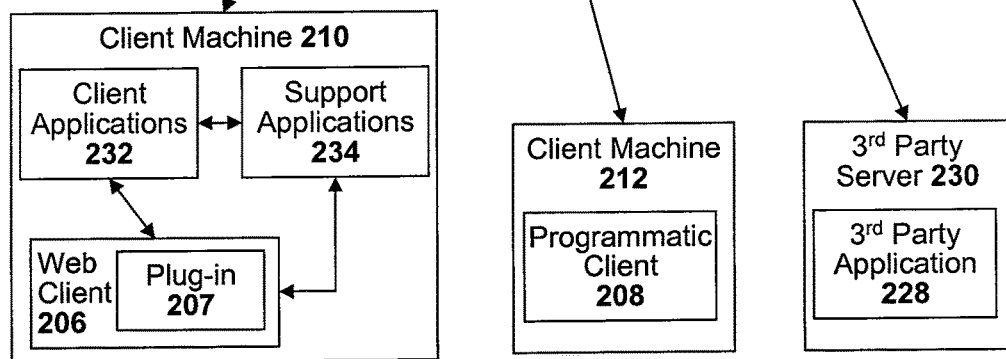
Figure 2

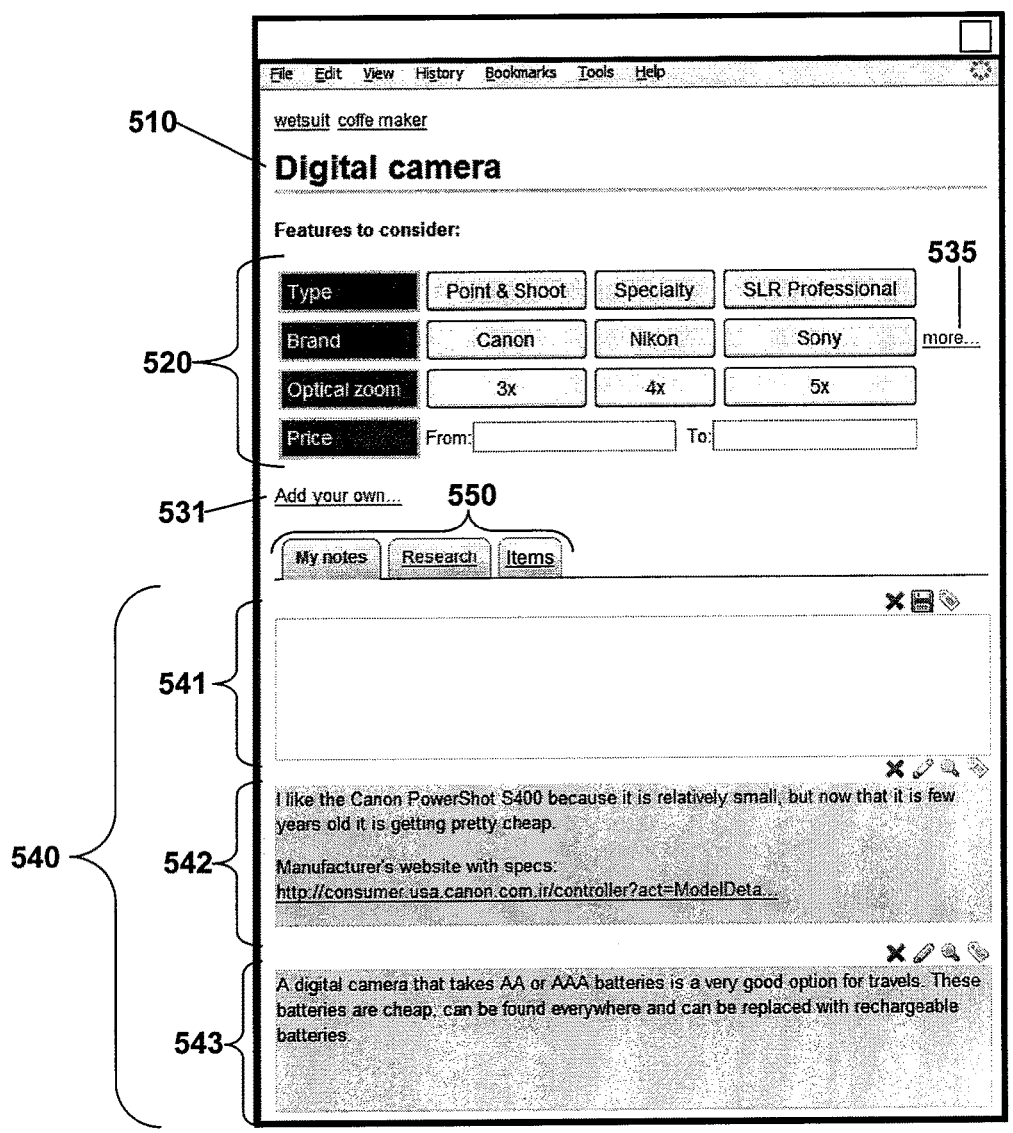
Figure 5A – My Notes View

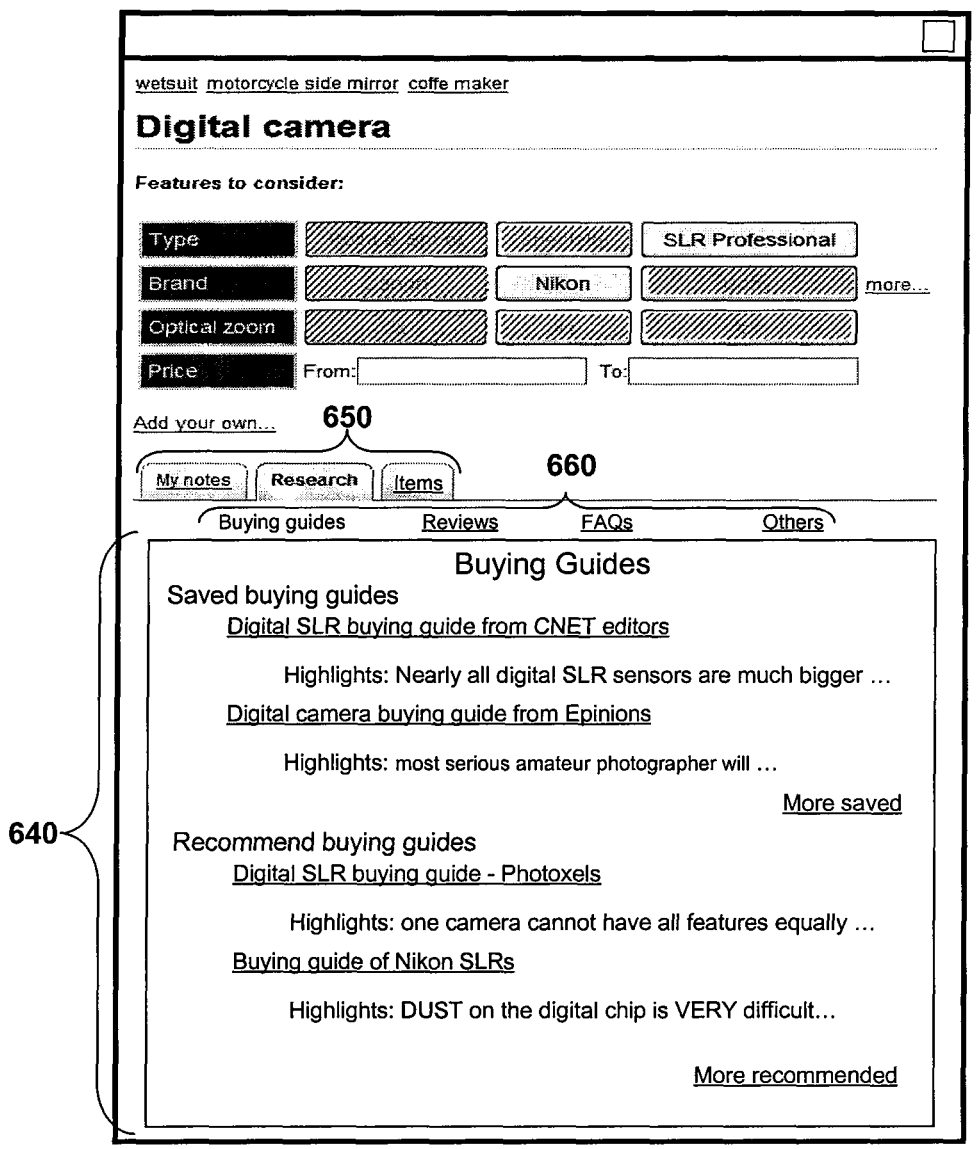
Figure 6A – Research: Buying Guides view

Figure 6B – Research: Reviews view wetsuit  motorcycle side mirror  coffe maker

Digital camera

Features to consider:

| Type | | | SLR Professional |
| Brand | | Nikon | | more... |
| Optical zoom | | | |
| Price | From: | | To: |

Add your own...

[ My notes ] [ Research ] [ Items ]

Buying guides    Reviews    FAQs    Others

Reviews

Saved review pages
    Digital SLR reviews at PhotographyReview.com
        Highlights: Nikon D80 Outstanding performance, ease of ...

Nikon D50 Digital camera review

Highlights: When color is key, the Nikon D50 delivers ...

More saved

Recommend review pages
    Digital SLR reviews - Shutterbug

Highlights: one camera cannot have all features equally ...

Buying guide of Nikon SLRs

Highlights: DUST on the digital chip is VERY difficult...

More recommended

Figure 6C – Research: FAQs view wetsuit  motorcycle side mirror  coffe maker

Digital camera

Features to consider:

| Type | | | SLR Professional |
| Brand | | Nikon | | more... |
| Optical zoom | | | |
| Price | From: | | To: |

Add your own...

[ My notes ] [ Research ] [ Items ]

Buying guides     Reviews     FAQs     Others

Frequently Asked Questions

Saved FAQ pages

Digital Camera Resources Page: Frequently Asked Questions

Highlights: I have $800 to spend on a digital camera. Which one should I get?

Nikon D50 Frequently Asked Questions

Highlights: Nikon D50 or Nikon D40x? ...

More saved

Recommend FAQ pages

Digital SLR FAQ - Shutterbug

Highlights: Which is better Canon 400D or Nikon D80?...

Nikon.com: Frequently Asked Questions

Highlights: AF vs. AF-S Nikon lenses?...

More recommended

Figure 7A
702    703    704
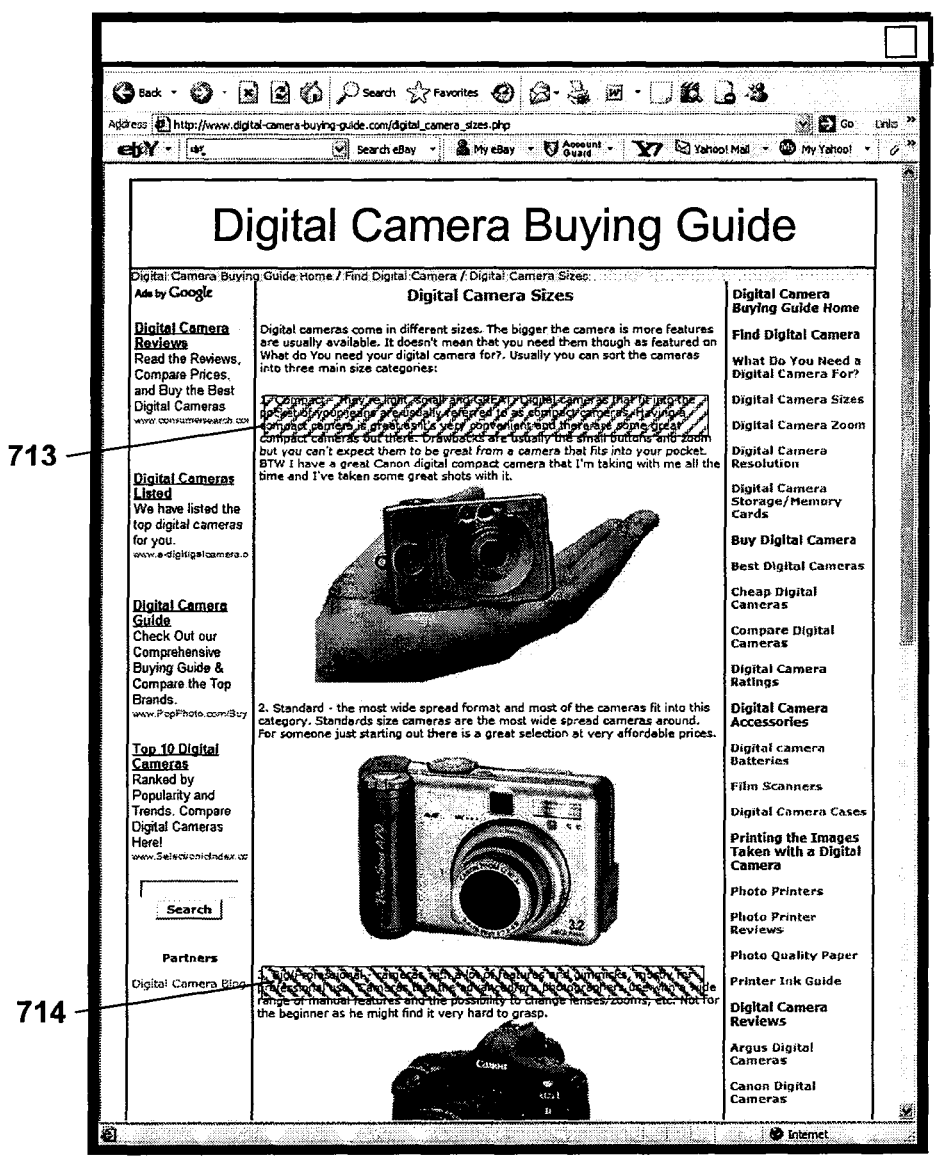
713
714
Figure 7B

Figure 8 – Items view

SYSTEM AND METHOD FOR COMMUNITY AIDED RESEARCH AND SHOPPING

RELATED APPLICATIONS

This application is a continuation of U.S. application Ser. No. 12/133,100, filed Jun. 4, 2008, and entitled, "SYSTEM AND METHOD FOR COMMUNITY AIDED RESEARCH AND SHOPPING," which is incorporated herein by reference in its entirety.

TECHNICAL FIELD

The present invention relates to the field of internet commerce. In particular, but not by way of limitation, the present invention discloses techniques for allowing an internet consumer to easily perform product research.

BACKGROUND

The World Wide Web aspect of the global internet has become a vast commercial marketplace where a consumer can find just about every type of product available. Even the traditional start of the holiday shopping season, the day after Thanksgiving known as "Black Friday", now has an internet corollary: Cyber Monday, the first Monday after the Thanksgiving Holiday.

Although internet commerce has been taking place for many years now, the industry is still in a relative infancy compared to normal stores and open air markets. Many people are still reluctant to use internet retail web sites since they do not feel familiar enough and they do not feel they can easily get the information needed to make good purchasing decisions. Even veteran internet shoppers can have difficulties in find the information that they need to make a good educated purchasing decision

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 2 illustrates a block diagram of a networked system that may be used to implement an internet commerce system.

FIG. 5A illustrates a template web page for the consumer helper application being used to perform product research on a digital camera type of product.

FIG. 6A illustrates a web interface for a consumer helper application displaying a set of buying guide web sites.

FIG. 6B illustrates a web interface for a consumer helper application displaying a set of product review web sites.

FIG. 6C illustrates a web interface for a consumer helper application displaying a set of relevant Frequently Asked Questions (FAQ) web sites.

FIG. 7A illustrates an example embodiment of a consumer helper application toolbar for annotating web pages.

FIG. 7B illustrates an example of a digital camera buying guide web page that has been annotated using the tool bar of FIG. 7A.

FIG. 8 illustrates an example of a web interface for a consumer helper application displaying a set of relevant products.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are mainly disclosed with reference to email systems that use the Simple Mail Transport Protocol (SMTP), the teachings can be used with other types of email protocols or other types of electronic communication systems. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
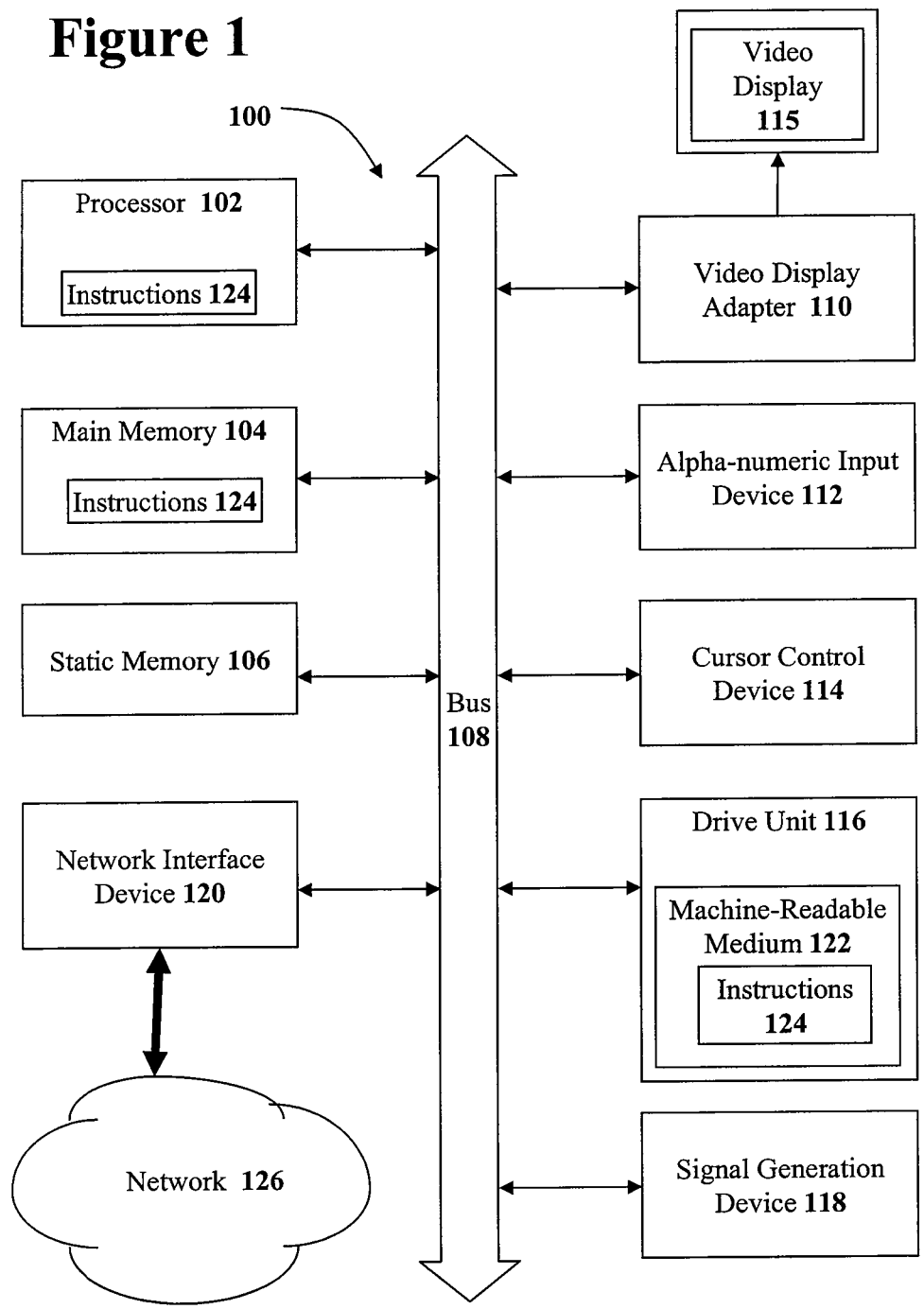
FIG. 1 illustrates a diagrammatic representation of machine in the example form of a computer system within which a set of instructions, for causing the machine to perform any one or more of the methodologies discussed herein, may be executed.

FIG. 1 illustrates a diagrammatic representation of a machine in the example form of a computer system 100 within which a set of instructions 124, for causing the machine to perform any one or more of the methodologies discussed herein, may be executed. In alternative embodiments, the machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network server, a network router, a network switch, a network bridge, or any machine capable of executing a set of instructions (sequential or otherwise) that specify actions to be taken by that machine. Further, while only a single machine is illustrated in FIG. 1, the term "machine" shall also be taken to include any collection of machines that individually or jointly execute a set (or multiple sets) of instructions to perform any one or more of the methodologies discussed herein.

The example computer system 100 illustrated in FIG. 1 includes a processor 102 (e.g., a central processing unit (CPU), a graphics processing unit (GPU) or both), a main memory 104, and a static memory 106. Any of these elements may communicate with each other via a bus 108. The computer system 100 may further include a video display adapter 110 that drives a video display system 115 such as a Liquid Crystal Display (LCD) or a Cathode Ray Tube (CRT). The example computer system 100 also includes an alphanumeric input device 112 (e.g., a keyboard), a cursor control device 114 (e.g., a mouse or trackball), a disk drive unit 116, a signal generation device 118 (e.g., a speaker), and a network interface device 120. Note that various embodiments of a computer system will not always include all of these peripheral devices.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media.

The instructions 124 for operating computer system 100 may be transmitted or received over a network 126 via the network interface device 120 utilizing any one of a number of well-known transfer protocols such as the File Transfer Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, flash memory, magnetic media, and carrier wave signals.

For the purposes of this specification, the term "module" includes an identifiable portion of computer code, computational or executable instructions, data, or computational object to achieve a particular function, operation, processing, or procedure. A module need not be implemented in software; a module may be implemented in software, hardware/circuitry, or a combination of software and hardware.

Internet Commerce Systems

FIG. 2 is a network diagram depicting a client-server system 200, within which one example embodiment may be deployed. A networked system 202, in the example forms of a network-based marketplace or publication system, provides server-side functionality via a network 204 (e.g., the Internet or Wide Area Network (WAN)) to one or more client systems. FIG. 2 illustrates two possible client systems: a web client 206 and a programmatic client 208 executing on respective client machines 210 and 212. The web client 206 may be a common web browser program such as the Internet Explorer browser developed by Microsoft Corporation of Redmond, Wash. State or the Firefox browser developed by Mozilla. A web client program may include one or more "plug-in" modules 207 that provide additional functionality to the web browser such as an Internet Explorer Browser Helper Object (BHO) or a Firefox extension.

An Application Program Interface (API) server 214 and a web server 216 are coupled to, and provide programmatic and web interfaces respectively to, one or more application servers 218. The application server(s) 218 host one or more marketplace applications such as commerce applications 220 and payment applications 222. The application server(s) 218 are, in turn, shown to be coupled to one or more database servers 224 that facilitate access to one or more databases 226.

The commerce applications 220 may provide a number of marketplace functions and services to users that access the networked system 202. The payment applications 222 may likewise provide a number of payment services and functions to users. The payment applications 222 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 220. While the marketplace and payment applications 220 and 222 are shown in FIG. 2 to both form part of the networked system 202, it will be appreciated that, in alternative embodiments, the payment applications 222 may form part of a payment service that is separate and distinct from the networked system 202.

Further, while the system 200 shown in FIG. 2 employs a client-server architecture, the present invention is of course not limited to such an architecture, and could equally well find application in a distributed, or peer-to-peer, architecture system. The various marketplace application(s) 220 and payment application(s) 222 could also be implemented as standalone software programs that do not necessarily have networking capabilities.

The web client 206 accesses the various commerce application(s) 220 and payment application(s) 222 via the web interface supported by the web server 216. Similarly, the programmatic client 208 accesses the various services and functions provided by the marketplace and payment applications 220 and 222 via the programmatic interface provided by the API server 214. The programmatic client 208 may be a seller application to enable sellers to author and manage listings on the networked system 202 in an off-line manner, and to perform batch-mode communications between the programmatic client 208 and the networked system 202. One example of such an application is the TurboLister application developed by eBay Inc., of San Jose, Calif.

FIG. 2 also illustrates a third party application 228, executing on a third party server machine 230, as having programmatic access to the networked system 202 via the programmatic interface provided by the API server 214. For example, the third party application 228 may, utilizing information retrieved from the networked system 202, support one or more features or functions on a website hosted by the third party. The third party website may, for example, provide one or more promotional, marketplace or payment functions that are supported by the relevant applications of the networked system 202.

Shopping with Internet Commerce Web Sites

Most internet commerce is currently conducted by a consumer running a web browser application on a personal computer that accesses a web server application implementing an internet commerce site. If the consumer happens to know the exact item that the consumer wishes to purchase then that consumer can simply enter the name of the desired product into a search box at an internet commerce site or into a generalized internet search engine.

However, most people do not know exactly what they wish to purchase when initially shopping for an item. Instead, the consumer will have a rough idea of what the consumer wishes to purchase. For example, a consumer may wish to purchase a digital camera but not much more detail than that. The consumer may have a budget and some rough specifications in mind such as a budget of $300 and a camera with a resolution greater than 4 megapixels. But beyond that, the user will do additional research and browsing to identify the camera to purchase.

On the Internet, the consumer may visit published review sites like cnet.com or user review sites like epinions.com in order to obtain reviews for some products. For example, computer system 310 running internet browser application 306 in FIG. 3 may access review web site server 292 in order to read review about products available for purchase.

Beyond computer-based shopping research, a consumer may talk to friends and colleagues to get additional information and recommendations. A consumer may also read traditional magazines and newspapers to learn about available products. Keeping track of all the information gained during this shopping research phase is difficult. The information may be spread across hand written notes on scraps of paper, articles cut from magazines and newspapers, the Uniform Resource Locator (URL) based "bookmarks" in the consumer's internet web browser, and in the consumer's memory.

After having collected all of this shopping research information, the consumer must then somehow consolidate all this information gathered during the shopping research phase. The consumer then analyzes the consolidated shopping research information in order to pick a specific product to purchase.

Figure 3:
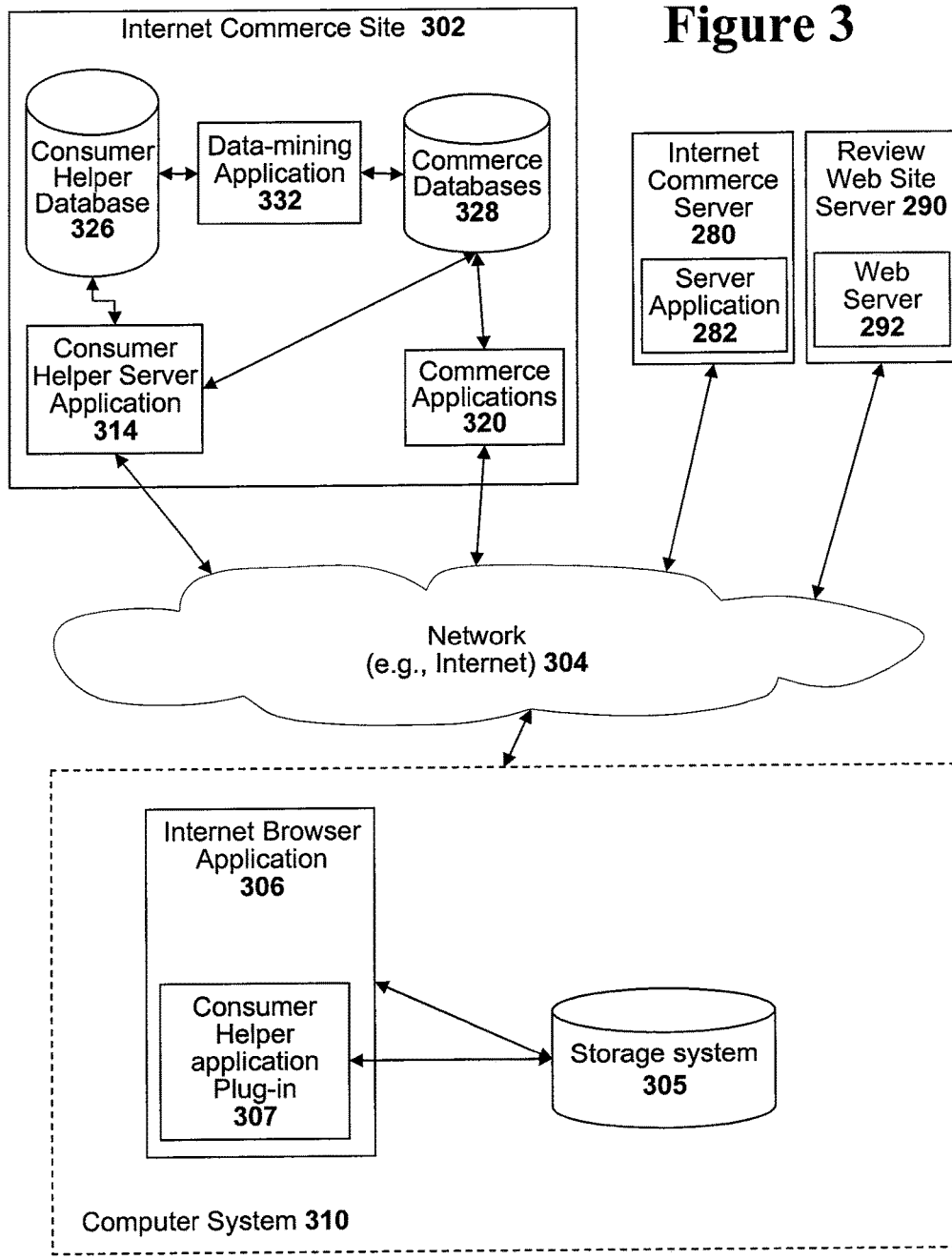
FIG. 3 illustrates a block diagram of a possible architecture for a consumer helper application system.

After selecting a particular product, the consumer must visit various web sites to find a good price on the desired item. Referring to FIG. 3, a consumer using computer system 310 and internet browser program 306 may visit internet commerce server 302, internet commerce server 280, and many other internet commerce servers attempting to find a low price on the desired product, low shipping fees, and a reputable vendor with desirable customer service policies.

This entire online shopping process has many shortcomings. For example, the process is not guided, information may easily become lost or forgotten, it is difficult to integrate collaborative input (such as the advice of friends/colleagues) into the process, and the gathered information is not organized or easily stored.

Consumer Helper Application for Internet Commerce Overview

To improve upon the consumer experience for internet shopping, this disclosure introduces a consumer helper application for internet commerce. The consumer helper application has been designed to integrate the techniques that are currently used by many internet consumers into a single application program. For example, the consumer helper application allows a user to take notes, store web site links, store web site annotations, obtain collaborative input, and perform other tasks commonly used by web site consumers. The consumer helper application stores all of the information gathered in a single place. Finally, the consumer helper application will suggest specific items for a consumer to purchase based up on the information gathered by the consumer into the consumer helper application.

Consumer Helper Application for Internet Commerce Architecture

FIG. 3 illustrates the architecture of one embodiment of a consumer helper application for internet commerce. The specific embodiment disclosed in FIG. 3 is just one possible architecture for implementing the teachings of the present disclosure.

In the consumer helper application system of FIG. 3, a consumer helper application plug-in 307 is installed to work with a user's internet browser application 306 on the user's computer system 310. The consumer helper application plug-in 307 may be a Browser Helper Object (BHO) in an embodiment designed for Microsoft's Internet Explorer, a browser extension program for the Firefox web browser, or any other suitable type of application program. By implementing the consumer helper application plug-in 307 as a BHO or browser extension, the consumer helper application plug-in 307 will be available when a user is browsing the World Wide Web of the internet using internet browser application 306. The consumer helper application plug-in 307 will use a local storage system 305 for storing notes, URLs, annotations, and any other information collected or entered by the user when using the consumer helper application.

In addition to the consumer helper application plug-in 307 on the user's computer, a consumer helper server application 314 is available on a network 304 such as the internet. Consumer helper server application 314 can provide the user with a starting point and an initial set of data that a user can use when research a prospective purchase. The consumer helper server application 314 has an associated consumer helper database 326 for storing information collected and generated by users of the consumer helper application system. Consumer helper server application 314 may also reference external data sources such as commerce databases 328 or internet commerce server 280.

Consumer Helper Application Operation

Figure 4:
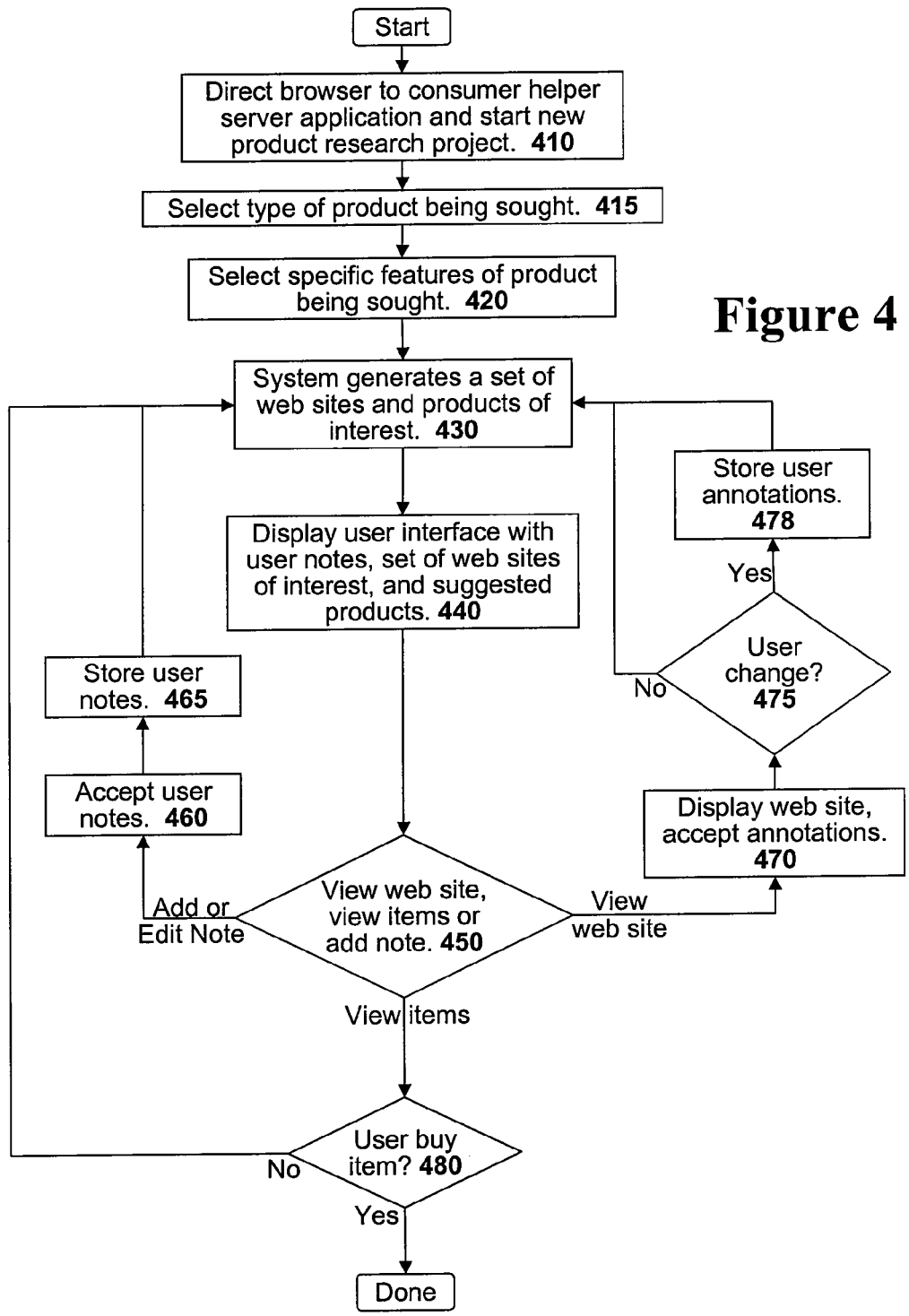
FIG. 4 illustrates a high-level flow diagram that illustrates how a consumer may interact with one embodiment of the consumer helper application system that is set forth in FIG. 3.

To best describe the operation of the consumer helper application, an example usage of the consumer helper application will be disclosed with reference to FIGS. 3 through 8. FIG. 4 illustrates a high-level flow diagram that describes how a consumer may interact with one embodiment of the consumer helper application. Initially, at step 410, a consumer directs his internet browser application 306 to the consumer helper server application 314 and requests that a new product research project be initiated. The consumer helper server application 314 may require the consumer to register and provide information in order to create a new account as is well known in the art of internet server systems. At this point, some embodiments of the consumer helper server application 314 may also allow the consumer to download and install the consumer helper application plug-in 307 in order to provide a better user experience for the consumer.

As part of the initiation of a new product research project, the consumer may be requested to specify how much of the consumer's information may be shared with other users of the shopping research system. The sharing of the consumer's information may be done on a completely anonymous basis such that no privacy is lost.

In one embodiment, the system provides a detailed set of information sharing preferences that allow a consumer to select between the following access control selections: private, global, targeted share, whole or selective share. If the consumer does not wish to share any information and thus wishes to keep all the information that the consumer is entering private completely to himself/herself, then the user will select "private". If the user does not mind sharing their information with everyone else that uses the system, then the consumer can select "global". If the consumer wishes to share their information with a particular user or a selected set of users then the consumer may select "targeted share". A consumer may further select the specific information that is shared such that if a consumer wishes to share all the information, then the consumer selects "whole" but if the user only wishes to share some of the information then the consumer will select "selective".

After starting a new research project at step 410, the consumer selects a particular type of product being researched, at step 415. In one embodiment, a set of templates for different product types are available. If a template for a specific product type is not available, a user may select a generic product type template. If enough consumers seek the same type of product that does not have a template available, then a template may be created for that product type which is in demand.

FIG. 5A illustrates a template web page interface for a digital camera 510 type of product. Referring back to FIG. 4, a consumer then selects a set of desired features for the product being sought at step 420. As illustrated in FIG. 5A, area 520 is designated as a features area where a user may select a set of desired features for the product type being sought. The set of selectable features is created as a template for each different product type. In the digital camera 510 product type example of FIG. 5A, a consumer may select type, brand, optical zoom, and price features in features area 520. The more button 535 allows the consumer is to see more features or feature values than are currently illustrated within area 520. In one embodiment, the consumer is allowed to adjust the selectable parameters for a particular product template.

Similarly, if a user wishes to add a new type of feature to the features area 520 for the current product type, the consumer may select "Add your own" link 531 to add a new type of feature for that product type. A set of user interfaces will allow the user to specify the name of the feature and a set of possible values for the new feature. This newly added feature and the rest of the consumer's choices are stored within consumer helper database 326. A data-mining application 332 can be used to continually review the contents of the consumer helper database 326. In this manner, the data-mining application 332 can identify any patterns or clusters the form within the consumer helper database 326. For example, if several different consumers all add a new feature called "image resolution" to the digital camera template then the data-mining application 332 will suggest to an administrator that a new feature called "image resolution" be added to the standard template for digital camera products.

Figure 5B:
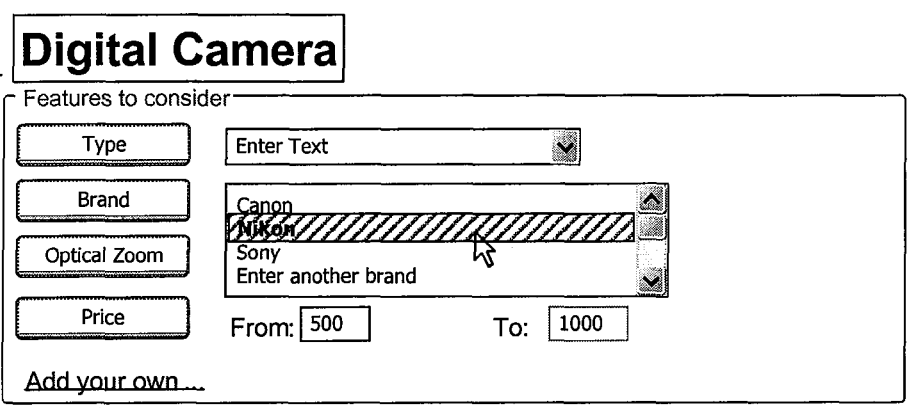
FIG. 5B illustrates an alternate web interface for a product features area that uses drop-down menus to select desired product features.

FIG. 5B illustrates an alternate embodiment of a features area 520 for a digital camera type of product. The alternate web interface of FIG. 5B for a product features area 520 uses drop-down menus to select desired product features. For example, the consumer is illustrated selecting the brand "Nikon" in the Brand portion of the features area 520 in FIG. 5B. Many different types of user interface techniques may be used. The main goal is to provide a set of features for the product type and a set of possible selections for those features such that a consumer may narrow down the possible product choices.

Referring back to FIG. 4, after selecting a set of product features at step 420, the consumer helper application generates a set of web sites and products that may be of interest at step 430. The system selects the set of web sites and products for the consumer depending on the type of product selected and the desired features for that type of product. In one embodiment, the set of products selected at step 430 are selected from a database of products currently available for sale at an associated internet commerce site. Thus, the shopping research system can be used to direct consumers to an associated internet commerce site. Next, at step 440, the system generates a user interface that displays notes taken by the consumer, the selected web sites of interest, and a suggest set of products that the consumer may wish to purchase. This information is collectively known as the "product research information".

In addition to selecting web sites and products that may be of interest to the consumer, step 430 may also be used to select advertisements that may be of interest to the consumer. Specifically, advertisements from manufacturers or retailers of products that the consumer has expressed an interest in may be selected and added to subsequent displays that will be presented to the consumer. Do the amount of information available at 430 very sophisticated advertising targeting may be performed with the system of the present disclosure. Specifically, these consumers have expressed an interest in purchasing a product and a great deal of information about the specific type of product that the consumer is interested is available for use in selecting an advertisement. With such detailed information available on the users of the system who are by their use of the system interested in purchasing a product, the value of the advertising opportunities will be very high.

Referring back to FIG. 5A, below the product features area 520 is a product research area 540. The product research area 540 is used to display the product research information that has been gathered by the consumer or suggested by the consumer helper application to help select a product for purchase. The specific type of product research information that is displayed in product research area 540 depends on which of the product research tabs 550 has been selected.

In FIG. 5A, the "My notes" tab of the product research tabs 550 has been selected such that a set note writing areas 541, 542, and 543 are illustrated. The note writing areas provide a personal web notepad to persist and organize the information the buyer discovers during the product research process. In one embodiment, the note writing areas allow multimedia information to be stored such as text, images, hyperlinks, and videos. For example, note writing area 542 in FIG. 5A includes a hyperlink to the web site of a particular product manufacturer.

If a consumer has specified that the consumer's data may be shared with other users, then the system may automatically make the consumer's notes available to other users of the system. Alternatively, a system administrator may review various notes entered and decide which notes entered by a consumer to available to other users of this system. In this manner, the best research notes entered by any user may be shared with other users looking for the same type of item.

In one embodiment a shared "Questions & Answers" section is created for each product type. In the Questions &

Answers section, various users may post questions that may be read by other users. This may be performed in the same manner that a user enters notes except that the note with the question will immediately be made available to other users of the system. For example, in the digital camera Questions & Answers section, a user may post a note with question "Is Canon D80 better than Z43 in low light condition?" Other users may then directly answer the question with another posting. Other users might attach questions to their publically posted notes and bookmarks (such as questions that are answered by the note) such that other users that have the same questions can locate the answers quickly.

In one embodiment, the system might examine a question that a user is posting and attempt to match the user's question to similar questions already answered and recommend those answers to the user before allowing a new question to be posted. In this manner, the system will prevent the same questions from being asked and answered repeatedly. Similarly, the system may match a user question to related answers (i.e. "see also").

Referring to FIG. 4, the system allows the consumer to view a web site, view a suggested item, or add/edit a note at step 450. If the user selects to add or edit a note, then the consumer helper application system proceeds to step 460 where it accepts the consumer's notations. The consumer may enter notes in the designated note writing areas 541, 542, and 543 as illustrated in FIG. 5A. After the consumer has completed the consumer's desired notations, the system then stores the user's notations at step 465 and then system then returns to step 430. In one embodiment, the user's notations are stored in the online consumer helper database 326. In this manner, the consumer's notations will be available from any other web browser enabled computer system that is coupled the network 304. Furthermore, the consumer's notations may be examined by a data-mining application 332.

At step 430, the system again generates a set of web sites and products that may be of interest to the consumer. Since the consumer may have entered new notes at step 460, the consumer helper application may consider these new notes when re-generating a set of web sites and products of interest. For example, a user may have entered the name of a particular name brand manufacturer in the notes such that a web site associated with that manufacturer may be added to the list of web sites of interest. Similarly, products made by that particular manufacture may receive an increased relevancy score such that those products will be displayed higher on a list of products of interest.

Referring again to FIG. 5A, the consumer may view different product research information in product research area 540 by selecting a different research tab 550. For example, if the consumer selects the "research" tab of research tabs 550 then the user interface of FIG. 6A may be generated. FIG. 6A illustrates a first type of research view that presents a list of buying guide web sites to the consumer. Specifically, the research view has a set of research type links 650 labeled "Buying Guides", "Reviews", "FAQs", and "other". As illustrated in FIG. 6A, the "Buying Guides" link has been selected such that a set of buying guide web sites are presented in research area 640.

The other research type links 650 of will cause other sets of web research sites to be displayed. For example, if the consumer selects the "Reviews" link from research type links 650 then the set of product review sites illustrated in FIG. 6B may be displayed to the consumer. Similarly, if the consumer selects the "FAQs" link (Frequently Asked Questions) from research type links 650 then the set of Frequently Asked Questions sites illustrated in FIG. 6C may be displayed to the consumer. If the consumer selects the "other" link then any other web sites that have been deemed of interest to the consumer may be displayed. For example, manufacturer web sites for the type of product being researched may be displayed in the "other" research page (not shown).

Referring back to the buying guides research view FIG. 6A, the buying guides in research area 640 have been divided into two sub areas. An upper sub area contains buying guides that have been saved by the consumer and thus must have been found useful by the consumer. A lower sub area lists other buying guides that have been selected at step 430 as being possible helpful to the consumer.

The consumer may visit any of the suggested web sites in order to learn more information about the desired product. Referring again to FIG. 4, if the consumer selects at step 450 to visit one of the suggested (or saved) web sites then the system proceeds to step 470 where the selected web site is displayed. Furthermore, when a consumer visits one of the suggested web sites, the consumer helper application plug-in 307 may present the consumer with a toolbar that can be used to help the consumer annotate and store any information that the consumer found to be useful.

For example, FIG. 7A illustrates one possible view of a consumer helper toolbar. The example consumer helper toolbar of FIG. 7A includes a "store page" button 702, a "The Good" button 703, and a "The Bad" button 704. The store page button 702 can be used to store the currently viewed web page as one of the web pages that will be presented in the "research" view as illustrated in FIGS. 6A to 6C. If the web page was one of the suggested research web pages then the web page will be moved from the lower sub area containing suggested web pages to the upper area that have been saved by the consumer.

Note that as long as the example consumer helper toolbar is available, it can be used at any time during the consumer's web browsing. Thus, if a friend sends the user a link to a useful web page for the product the user is researching then the consumer can select the "store page" button 702 to store that web page into the consumer helper application. The consumer helper application may ask the user to specify if the web page is a buying guide, a product review, a FAQ, or any other type of web page in order to place the web page in proper area of the reviews section illustrated in FIGS. 6A to 6C. In one embodiment, the consumer helper application may scan the contents of the web page and attempt to classify the web page on its own.

The consumer helper application plug-in may store the link to that web page into the consumer helper database 326. If data-mining application 332 notices that several different consumers researching the same type of product add the same web page, then the data-mining application 332 may automatically add that web page as a standard suggested web page for that product type. Alternatively, the data-mining application 332 may suggest to an administrator that the popular web site be added to the set of standard suggested web pages for that product type.

The "The Good" button 703 and the "The Bad" button 704 in FIG. 7A can be used to high-light specific information on the currently displayed web page for later reference. For example, FIG. 7B illustrates a digital camera buy guide web page that has two sections of text that have been high-lighted. A first section of text 713 has been high-lighted using "The Good" button 703 as containing good information about a particular product. A second section of text 714 has been high-lighted using "The Bad" button 704 as containing bad information about a particular product. Referring back to FIG. 4, any of these high-lighting annotations will be by the consumer helper application plug-in 307 at step 478. In this manner, if the consumer visits the same web page then the consumer helper application plug-in 307 will display the same high-lighted annotations on that re-visited web page.

The consumer helper application plug-in may store the high-lighting of a web page into the consumer helper database 326 such that the information may be shared among all the user of the consumer helper application. For example, the data-mining application 332 may determine which sections of the various stored web pages have been highlighted by many users. The consumer helper application may then allow a consumer to use this information by displaying those most high-lighted sections with high-lighting that may be in a different color. In this manner the collective high-lighting of many different consumers researching the same type of product on the same web page can be used to show the aspect that many consumers have found to be important After storing user annotations to a web site and returning to the product research page, the system may generate a new set of web sites of interest at step 430. The system may use any additional information store while the consumer was browsing web sites to help re-generate a set of web sites and products of interest. For example, the system may attempt to locate web sites and products that include keywords from text that a consumer high-lighted using "The Good" button 703. Similarly, the system may eliminate or lower the relevancy score of products that contain keywords in text that the consumer high-lighted using "The Bad" button 704. After re-generating the set of web sites and products of interest at step 430 the system proceeds to step 440 to display the user interface with user notes, web sites of interest, and suggested products for the consumer.

Figure 8:
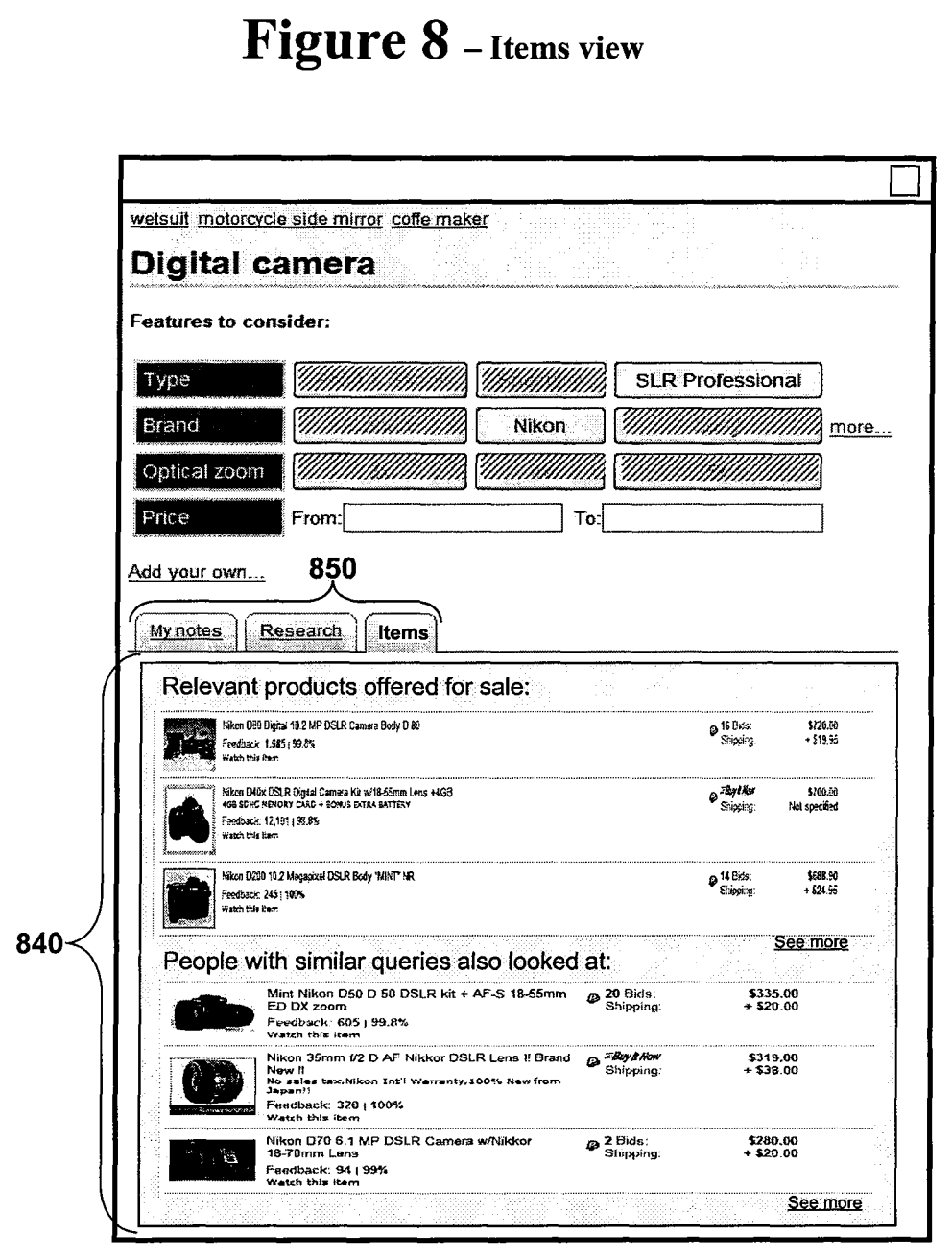

FIG. 8 illustrates one possible embodiment of a suggested product view that may be displayed if the "items" tab of the product research tabs 850 has been selected. In the suggested product view of FIG. 8, the product research area 840 display a set of products that the consumer is likely to be interested in as determined by the information entered by the consumer (the product type selected, the product features selected, the notes entered by the consumer, etc.) and the actions taken by the consumer (the web pages the consumer viewed, the web page text that has been annotated, etc.).

Numbers factors can be used to select and filter the products that will appear in the suggest items view of FIG. 8. Products from an internet commerce site that funds the development and operation of the consumer helper application system may receive highly desired screen position such as the top of the product list. The selected products may be filtered and sorted based the consumer's specified criteria and relevancy. Furthermore, collaborative information such as consumer demand data may be used to help sort the items presented. In one embodiment, vendors of products available for sale may purchase the right to have their products that fulfil the consumer's requirements appear on the first page of such suggested product web pages.

In the embodiment illustrated in FIG. 8, the product research area 840 has been divided into an upper area and a lower area. In the embodiment of FIG. 8, the upper area displays a set of products that have been selected by the consumer helper system at step 430. This system may also be aided by the consumer's own shopping history. For example, if the user has purchased SD-RAM style flash memory cards in the past then the system may display a preference towards digital camera systems that use SD-RAM style flash memory cards. The lower portion of the product research area 840 contains a set of products that have been viewed by other consumers that have expressed similar interests. This set of products may be generated using the commerce databases 328 associated with internet commerce site 302.

The preceding description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. § 1.72(b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:
1. A method comprising:
generating an annotation web page interface for assisting a plurality of users to perform research pertaining to a type of a product, the annotation web page interface comprising a features area comprising a selection feature and a set of selectable values corresponding to various features of different product types, the annotation web page further comprising a highlighting feature for annotating presentable information of a content page of a web site providing information about the product;
receiving, from a plurality of computer systems of the plurality of users using the annotation web page interface, a plurality of annotations of presentable information of the content page of the web site, the plurality of annotations including highlighting associated with portions of the presentable information;
determining, at a server, that a first portion of the presentable information includes good information corresponding to positive aspects of the product based on a first set of the plurality of annotations highlighting the first portion of the presentable information on the content page of the web site by selecting the first portion using the selection feature and designating the highlighted first portion as the good information using a first selectable value;

determining, at the server, that a second portion of the presentable information includes bad information corresponding to negative aspects of the product based on a second set of the plurality of annotations highlighting the second portion of the presentable information on the content page of the web site by selecting the second portion using the selection feature and designating the highlighted second portion as the bad information using a second selectable value;

based on an accessing of the content page of the web site by a first user of the plurality of users, generating, at the server for presentation to the first user, a collective highlighting of the presentable information, the collective highlighting including a designation of the first portion of the presentable information on the content page of the web site as the good information and a designation of the second portion of the presentable information on the content page of the web site as the bad information; and presenting the content page of the web site to the first user including the collective highlighting including the designation of the first portion of the presentable information on the content page of the web site as the good information and the designation of the second portion of the presentable information on the content page of the web site as the bad information.

2. The method of claim 1, wherein a second user of the plurality of users specifies an annotation of the plurality of annotations by accessing the presentable information of the content page from a web browser application, selecting a target portion of the presentable information about the product, and activating a user interface element of the web browser application to mark the target portion of the presentable information as either good information or bad information.

3. The method of claim 2, wherein the user interface element is one of a plurality of user interface elements provided to the second user in an add-on to the web browser application, the plurality of user interface elements including a user interface element for marking a selected portion of the presentable information of the content page as including positive information and a second user interface element for marking the selected portion of the presentable information of the content page as including negative information.

4. The method of claim 1, further comprising:
identifying that a reference to a product is included in the bad information;
based on the identifying, decreasing a relevancy score of an additional content page, the additional content page pertaining to the product; and
based on the relevancy score not transgressing a threshold, preventing a link to the additional content page from being suggested to the first user.

5. The method of claim 1, further comprising:
identifying that a reference to a product is included in the good information;
based on the identifying, increasing a relevancy score of an additional content page, the additional content page pertaining to the product; and
based on the relevancy score transgressing a threshold, suggesting a link to the additional content page to the first user.

6. The method of claim 5, further comprising designating the content page as a standard suggested content page pertaining to researching of a type of the product, the designating being based on a determination that a set of the plurality of users found the content page to be useful in the researching of the type of the product.

7. The method of claim 6, wherein the determination that the set of the plurality of users found the content page to be useful in the researching of the type of the product is based on a determination that each user of the set of the plurality of users stored the content page for later reference while researching the type of the product.

8. A system comprising:
non-transitory memory storing instructions; and
one or more processors configured to execute the instructions to cause the system to perform operations comprising:
generating an annotation web page interface for assisting a plurality of users to perform research pertaining to a type of a product, the annotation web page interface comprising a features area comprising a selection feature and a set of selectable values corresponding to various features of different product types, the annotation web page further comprising a highlighting feature for annotating presentable information of a content page of a web site providing information about the product;
receiving, from a plurality of computer systems of the plurality of users using the annotation web page interface, a plurality of annotations of presentable information of the content page of the web site, the plurality of annotations including highlighting associated with portions of the presentable information;
determining, at a server, that a first portion of the presentable information includes good information corresponding to positive aspects of the product based on a first set of the plurality of annotations highlighting the first portion of the presentable information on the content page of the web site by selecting the first portion using the selection feature and designating the highlighted first portion as the good information using a first selectable value;
determining, at the server, that a second portion of the presentable information includes bad information corresponding to negative aspects of the product based on a second set of the plurality of annotations highlighting the second portion of the presentable information on the content page of the web site by selecting the second portion using the selection feature and designating the highlighted second portion as the bad information using a second selectable value;
based on an accessing of the content page of the web site by a first user of the plurality of users, generating, at the server for presentation to the first user, a collective highlighting of the presentable information, the collective highlighting including a designation of the first portion of the presentable information on the content page of the web site as the good information and a designation of the second portion of the presentable information on the content page of the web site as the bad information; and
presenting the content page of the web site to the first user including the collective highlighting.

9. The system of claim 8, wherein a second user of the plurality of users specifies an annotation of the plurality of annotations by accessing the presentable information of the content page from a web browser application, selecting a target portion of the presentable information about the product, and activating a user interface element of the web browser application to mark the target portion of the presentable information as either good information or bad information.

10. The system of claim 9, wherein the user interface element is one of a plurality of user interface elements provided to the second user in an add-on to the web browser application, the plurality of user interface elements including a user interface element for marking a selected portion of the presentable information of the content page as including positive information and a second user interface element for marking the selected portion of the presentable information of the content page as including negative information.

11. The system of claim 8, wherein the operations further comprise:
   identifying that a reference to a product is included in the bad information;
      based on the identifying, decreasing a relevancy score of an additional content page, the additional content page pertaining to the product; and
      based on the relevancy score not transgressing a threshold, preventing a link to the additional content page from being suggested to the first user.

12. The system of claim 8, wherein the operations further comprise:
   identifying that a reference to a product is included in the good information;
      based on the identifying, increasing a relevancy score of an additional content page, the additional content page pertaining to the product; and
      based on the relevancy score transgressing a threshold, suggesting a link to the additional content page to the first user.

13. The system of claim 12, wherein the operations further comprise designating the content page as a standard suggested content page pertaining to researching of a type of the product, the designating being based on a determination that a set of the plurality of users found the content page to be useful in the researching of the type of the product.

14. The system of claim 13, wherein the operations further comprise determining that the set of the plurality of users found the content page to be useful in the researching of the type of the product is based on a determination that each user of the set of the plurality of users stored the content page for later reference while researching the type of the product.

15. A non-transitory machine readable medium embodying a set of instructions that, in response to being executed by one or more processors, cause performance of operations, the operations comprising:
   generating an annotation web page interface for assisting a plurality of users to perform research pertaining to a type of a product, the annotation web page interface comprising a features area comprising a selection feature and a set of selectable values corresponding to various features of different product types, the annotation web page further comprising a highlighting feature for annotating presentable information of a content page of a web site providing information about the product;
   receiving, from a plurality of computer systems of the plurality of users using the annotation web page interface, a plurality of annotations of presentable information of the content page of the web site, the plurality of annotations including highlighting associated with portions of the presentable information;
   determining, at a server, that a first portion of the presentable information includes good information corresponding to positive aspects of the product based on a first set of the plurality of annotations highlighting the first portion of the presentable information on the content page of the web site by selecting the first portion using the selection feature and designating the highlighted first portion as the good information using a first selectable value;
   determining, at the server, that a second portion of the presentable information includes bad information corresponding to negative aspects of the product based on a second set of the plurality of annotations highlighting the second portion of the presentable information on the content page of the web site by selecting the second portion using the selection feature and designating the highlighted second portion as the bad information using a second selectable value;
   based on an accessing of the content page of the web site by a first user of the plurality of users, generating, at the server for presentation to the first user, a collective highlighting of the presentable information, the collective highlighting including a designation of the first portion of the presentable information on the content page of the web site as the good information and a designation of the second portion of the presentable information on the content page of the web site as the bad information; and
   presenting the content page of the web site to the first user including the collective highlighting.

16. The non-transitory machine readable medium of claim 15, wherein a second user of the plurality of users specifies an annotation of the plurality of annotations by accessing the presentable information of the content page from a web browser application, selecting a target portion of the presentable information about the product, and activating a user interface element of the web browser application to mark the target portion of the presentable information as either good information or bad information.

17. The non-transitory machine readable medium of claim 16, wherein the user interface element is one of a plurality of user interface elements provided to the second user in an add-on to the web browser application, the plurality of user interface elements including a user interface element for marking a selected portion of the presentable information of the content page as including positive information and a second user interface element for marking the selected portion of the presentable information of the content page as including negative information.

18. The non-transitory machine readable medium of claim 15, the operations further comprising:
   identifying that a reference to a product is included in the bad information;
   based on the identifying, decreasing a relevancy score of an additional content page, the additional content page pertaining to the product; and
   based on the relevancy score not transgressing a threshold, preventing a link to the additional content page from being suggested to the first user.

19. The non-transitory machine readable medium of claim 15, the operations further comprising:
   identifying that a reference to a product is included in the good information;
   based on the identifying, increasing a relevancy score of an additional content page, the additional content page pertaining to the product; and
   based on the relevancy score transgressing a threshold, suggesting a link to the additional content page to the first user.

20. The non-transitory machine readable medium of claim 19, the operations further comprising designating the content page as a standard suggested content page pertaining to researching of a type of the product, the designating being based on a determination that a set of the plurality of users found the content page to be useful in the researching of the type of the product.

* * * * *